United States Patent Office 3,344,172
Patented Sept. 26, 1967

3,344,172
HALOACETIC ACID SALTS OF CYCLOBUTANE-1,2-BIS(METHYLENE AMINE)
Norman W. Standish, Shaker Heights, and Janice L. Greene, Warrensville Heights, Ohio, assignors to The Standard Oil Company, Cleveland, Ohio, a corporation of Ohio
No Drawing. Filed Sept. 1, 1964, Ser. No. 393,759
4 Claims. (Cl. 260—501)

This invention relates to new chemical compounds, more particularly to the mono-, di- and trihaloacetic acid salts of cyclobutane-1,2-bis (methylene amine) having the following general formula:

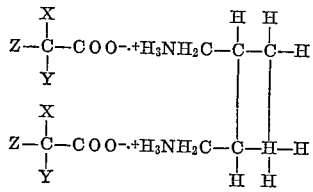

where X and Y may be either hydrogen or halogen and Z is a halogen such as fluorine, chlorine, bromine or iodine and preferably chlorine.

The novel compounds can be prepared by mixing equal molar amounts of solutions of haloacetic acids and the cyclobutane-1,2-bis (methylene amine) each separately dissolved in a common solvent, whereupon the salt precipitates.

As illustrative of the process for preparing the salts, two moles of a mono-, di- or trihaloacetic acid such as trichloroacetic acid or a mixture thereof is dissolved in one liter of an organic solvent, such as acetone or ethyl alcohol in a two liter flask. One mole of cyclobutane-1,2-bis (methylene amine) is dissolved in the solvent in another two liter flask. The two solutions are then mixed and the salt precipitates and is separated by filtration. All of the above steps are conducted at ambient temperature.

The salts are all white crystalline solids, soluble in water and aqueous solutions, but insoluble in the common organic solvents.

The melting points are as follows:

| Salt: | Melting point, ° C. |
| --- | --- |
| Monochloroacetic acid | 138–140 |
| Dichloroacetic acid | 165–170 |
| Trichloroacetic acid | 174–179 |

The compositions of this invention are useful in that they are very stable forms of the cyclobutane diamine which can be stored for long periods of time under ordinary conditions. The diamine itself, which is a useful intermediate in the formation of the diisocyanate and in the formation of polyamides by condensation with polybasic acids, is unstable in that it is readily oxidized and converted to the carbonate by action of air.

The novel compounds of the invention are also useful as chemosterilants. Mixed salts may be used as well as mixtures of the salts. The monochloro salt is preferred because less is required on a weight basis for equal effectiveness. The presence of two chloro and amino groups gives the compound its effectiveness but additional chloro groups are not harmful. As illustrative of this use, 1 percent by weight of the mono-chloro salt was dissolved in a simple sugar syrup and adult screw worm flies were permitted to feed on this sugar syrup solution for five days. None of the eggs laid by the female screw worm flies hatched. As a control, identical screw worm flies were allowed to feed on the same simple sugar syrup not containing any added compound for the same period of time. The eggs laid by the female hatched in a normal manner. The salt does not act as a chemosterilant when applied topically.

In the case of house flies subjected to the same test, the extent of the pupa development into flies was reduced 90%.

Similarly, the trichloroacetic salt is effective against spider mites. In a test, lima bean plants were infested with from fifty to one hundred adults of the strawberry spider mite, *Tetranychus atlanticus*, prior to testing. The infested plants were treated with the test material and held for five days. Adult mortality as well as ovicidal action was noted. One half of the spider mites present in the plants had been killed in this time.

We claim:
1. The compound having the following formula:

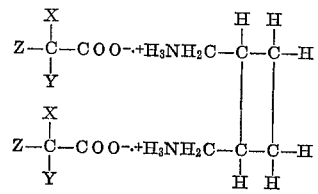

where X and Y are selected from the group consisting of hydrogen and chlorine, and Z is a halogen.
2. The compound having the formula of claim 1 wherein Z is chlorine, X is hydrogen and Y is hydrogen.
3. The compound having the formula of claim 1 wherein Z is chlorine, X is chlorine and Y is hydrogen.
4. The compound having the formula of claim 1 wherein Z, X and Y each is chlorine.

References Cited

UNITED STATES PATENTS

| 2,393,086 | 1/1946 | Bousquet | 260—501 |
| 2,649,363 | 8/1953 | Swezey | 71—2.7 |
| 2,697,721 | 12/1954 | Kelly | 260—501 |
| 3,047,542 | 7/1962 | Lang | 260—539 |
| 3,192,262 | 6/1965 | Schreyer | 260—563 |

OTHER REFERENCES

Vashkov et al.; Trudy, Tsentral Nauch. Issledovatel. Dezinfekts Inst. 1954, No. 8, 27–30; Referat Zhur. Khim., Biol. Khim. 1955, No. 4004. C. A. relied on vol. 50, column 5082i (1956).

LORRAINE A. WEINBERGER, *Primary Examiner.*
M. WEBSTER, *Assistant Examiner.*